Patented Jan. 15, 1952

2,582,743

UNITED STATES PATENT OFFICE 2,582,743

PARA-TERTIARY BUTYLCYCLOHEXANYL ACETATE

Martin Bollmann, Krefeld-Uerdingen, and Erwin Kroning, Krefeld, Germany, assignors to Farbenfabriken Bayer, Krefeld-Uerdingen, Germany No Drawing. Application October 25, 1949, Serial No. 123,535. In Germany October 1, 1948

1 Claim. (Cl. 260—488)

This invention relates to a new scent and to scent compositions containing the same.

p-Tertiary butyl cyclohexanol has a musty camphorlike smell and is thus unsuitable for scent. We have now found that the acetic ester of p-tertiary butyl cyclohexanol has a pleasant smell reminiscent of methyl-ionone, iris and vetiver acetate and is therefore particularly suitable for making of scent compositions of the character of L'origan, Russian leather and like scent groups.

According to the present invention, p-tertiary butyl cyclohexanyl acetate is obtained in a way known per se by esterification of p-tertiary butyl cyclohexanol. For example a mixture of 100 parts by weight of p-tertiary butyl cyclohexanol, 100 parts by weight of acetic anhydride and 20 parts by weight of anhydrous acetate is heated for two hours under reflux. After cooling the reaction product is washed first with diluted soda lye and then with water until neutral reaction is obtained. After drying the reaction product is distilled at 100–105° C. under 8 mms. mercury gauge. About 100 parts by weight of p-tertiary butyl cyclohexanyl acetate are obtained. The acetate is a colourless liquid with a specific gravity of 0.9429 at 15° C.

A scent composition of the character of sandalwood oil with the use of p-tertiary butyl cyclohexanyl acetate may be made up as follows:

10 parts by weight of p-tertiary butyl cyclohexanyl acetate
33 parts by weight of sandalwood oil (East Indian)
10 parts by weight of geranol
5 parts by weight of citronellol
5 parts by weight of phenylethyl alcohol
5 parts by weight of musk ambrette
3 parts by weight of cumarin
5 parts by weight of benzyl acetate
5 parts by weight of Resinoid Mousse de Chêne
3 parts by weight of vetiver acetate
16 parts by weight of benzyl salicylate A scent composition of the character of L'origan with the use of p-tertiary butyl cyclohexanyl acetate may be made up e. g. as follows:

10 parts by weight of p-tertiary butyl cyclohexanyl acetate
0.5 part by weight of iso-eugenol
0.1 part by weight of anisic aldehyde
1 part by weight of rose
0.3 part by weight of bergamot oil
3 parts by weight of jasmine
10 parts by weight of benzyl alcohol

We claim:
p-Tertiary butyl cyclohexanyl acetate.

MARTIN BOLLMANN.
ERWIN KRONING.

REFERENCES CITED

The following references are of record in the file of this patent:

UNITED STATES PATENTS

| Number | Name | Date |
|---|---|---|
| 2,376,105 | Williams | May 15, 1945 |